April 23, 1929. R. C. GOODELL 1,710,417
STIRRER
Filed Nov. 14, 1927

Inventor
R. C. Goodell
by Hazard and Miller
Attorneys

Patented Apr. 23, 1929.

1,710,417

UNITED STATES PATENT OFFICE.

RICHARD C. GOODELL, OF SANTA BARBARA, CALIFORNIA.

STIRRER.

Application filed November 14, 1927. Serial No. 233,184.

This invention relates to kitchen articles, and more especially to a stirrer of the type used for light mixing and beating in the culinary art.

An object is the provision of an improved stirrer or beater capable of more quickly and thoroughly performing its function such as mixing mayonnaise, beating eggs, or whipping cream.

With the foregoing and other objects in view which will be made manifest in the following detailed description and specifically pointed out in the appended claims, reference is had to the accompanying drawings for an illustrative embodiment of the invention, wherein:

Figure 1:
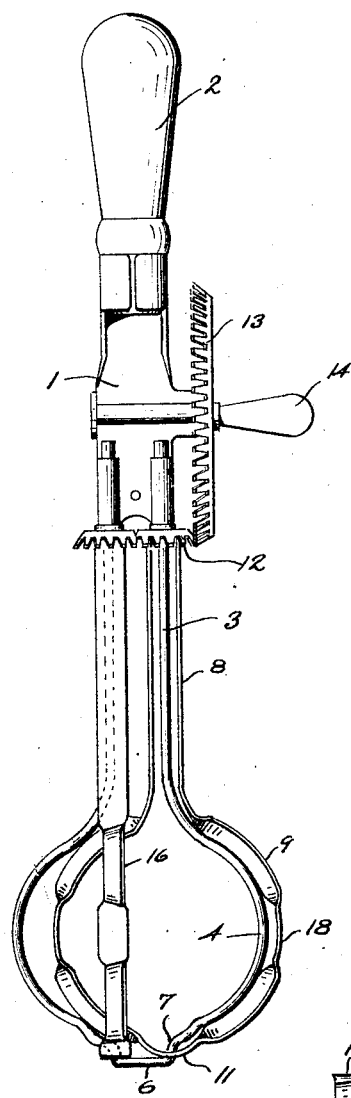
Figure 1 is a front elevation of the improved stirrer of my invention.
Figure 2:
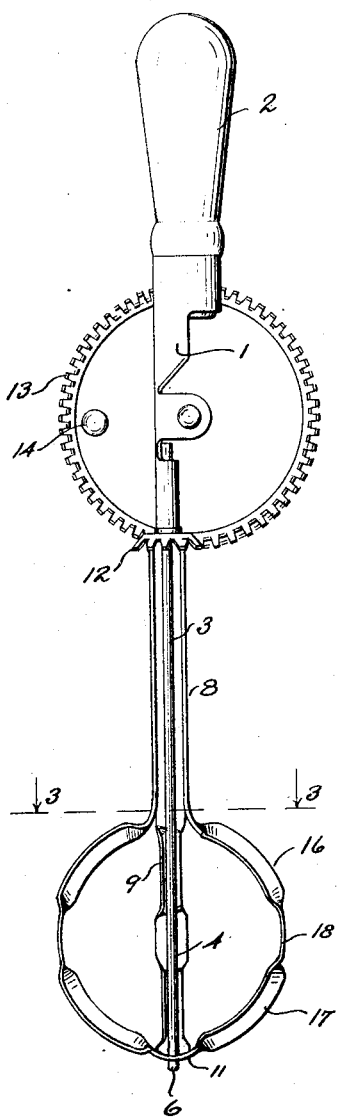
Fig. 2 is a side elevation of the stirrer of Figure 1.
Figure 3:
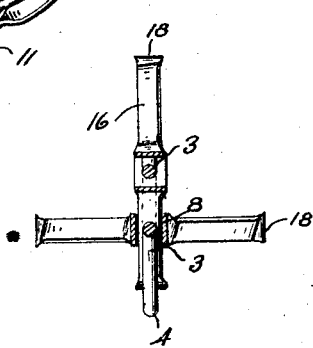
Fig. 3 is a horizontal sectional view of the stirrer, the plane of section being indicated by the line 3—3 of Figure 2.

Referring to the accompanying drawings wherein similar reference characters designate similar parts throughout, the preferred embodiment of my improved stirrer comprises a head 1, to which is rigidly secured, a handle 2. A U-shaped frame 3 is extended downwards from the bottom of the head 1, and the lower end of the frame 3 is extended in the form of a hollow circle 4, the bottom 6 of which is substantially straight and connected to the circle 4 by a pair of spaced vertical sections 7 to provide journals. Mounted for rotation upon each of the legs of the U-shaped frame 3, is a U-shaped stirring element 8; and the bottom of each of the elements 8 is extended to provide a paddle 9 in the form of a hollow circle. The bottom 11 of each of the paddles 9 is journaled upon one of the vertical sections 7 of the frame 3. Each stirring element 8 is provided at its top with a gear 12, each of which is journaled upon the top of one of the legs of the frame 3 and in engagement with the other gear 12. A larger driving gear 13 is pivoted to the head 1, and a handle 14 is carried by the gear 13 to facilitate its operation. The stirring elements 8 are positioned closely adjacent each other, and are so positioned that when rotated, each side of each of the paddles 9 intersects the plane of the other paddle 9 as best shown in Figures 1 and 3. The arrangement of the gears 12 is such that when rotated by the larger gear 13, the stirring elements 8 will be revolved in opposite directions.

The structure so far described is that of the well known egg-beater, and no claim is made thereto. The improvement of my invention however, comprises providing a plurality of mixing blades 16 and 17 upon the upper and lower parts respectively, of each of the paddles 9. The lower blades 17 are arranged with their leading edges inclined downwards so that as they are rotated in a fluid, the fluid engaged thereby is directed upwards; and the upper blades 16 are arranged with their leading edges inclined upwards so that fluid engaged by the blades 16 is directed downwards.

It is thus seen that a very quick and thorough mixing may be effected by the use of my improved stirrer. The two fluid streams, one being directed upwards from the lower blades 17 and the other being directed downwards from the upper blades 16, being forced to intermingle somewhere within the confines of the path of travel of the paddles 9, and then thoroughly broken up as they emerge between the straight sections 18 of the paddles 9 between the blades 16 and 17.

While my invention has been described as having circular paddles, it is to be understood that I do not wish to limit myself to this form of paddle. The essential feature of my invention is a pair of rotatable mixing blades, disposed one above the other, the upper blade being adapted to direct the material being stirred downwards, and the lower blade being adapted to direct the material upwards.

It will be understood that various changes in the details of construction may be made without departing from the spirit or scope of the invention as defined by the appended claims.

I claim:

1. A stirrer comprising a frame, a stirring element journaled thereon, a paddle in the form of a hollow circle carried by said stirring element, a blade arranged on the lower part of said paddle, with its leading edge inclined downwards, a blade arranged on the upper part of said paddle, with its leading edge inclined upwards, means for rotating said stirring element and a blade connecting said inclined blades and disposed with the plane thereof substantially at a tangent to the line of rotation of the paddle.

2. A stirrer comprising a frame, a plurality of stirring elements journaled thereon, a paddle in the form of a hollow circle carried by each of said stirring elements, a blade arranged on the lower part of each of said paddles, with its leading edge inclined downwards, a blade arranged on the upper part of each of said paddles, with its leading edge inclined upwards, means for rotating said stirring elements and a blade connecting each pair of said inclined blades and disposed with the plane thereof substantially at a tangent to the line of rotation of the associated paddle.

3. A stirrer comprising, a frame, a stirring element journaled thereon, a paddle in the form of a hollow circle carried by said stirring element, blades arranged on the lower part of said paddle, with their leading edges inclined downwards, blades arranged on the upper part of said paddle, with their leading edges inclined upwards, means for rotating said stirring elements and a blade connecting each pair of said inclined blades and disposed with the plane thereof substantially at a tangent to the line of rotation of the associated paddle.

4. A stirrer comprising a U-shaped frame extended at its lower end into the form of a hollow circle, a pair of U-shaped stirring elements journaled on the respective legs of said frame and geared together for rotation in opposite directions, each of said elements being extended at its lower end to provide a paddle in the form of a hollow circle, said elements being arranged closely adjacent each other for their paddles to rotate freely within the circular part of the frame, and for each side of each of the paddles to intersect the plane of the other paddle once during each revolution thereof, blades arranged on the lower part of each of said paddles, with their leading edges inclined downwards, blades arranged on the upper part of each of said paddles, with their leading edges inclined upwards, means for rotating said stirring elements and a blade connecting each pair of said inclined blades and disposed with the plane thereof substantially at a tangent to the line of rotation of the associated paddle.

In testimony whereof I have signed my name to this specification.

RICHARD C. GOODELL.